United States Patent [19]
Herbert et al.

[11] Patent Number: 6,148,316
[45] Date of Patent: Nov. 14, 2000

[54] FLOATING POINT UNIT EQUIPPED ALSO TO PERFORM INTEGER ADDITION AS WELL AS FLOATING POINT TO INTEGER CONVERSION

[75] Inventors: Jeffrey Charles Herbert, Nazareth; Jason F. Gouger, Shawnee-On-Delaware, both of Pa.; Razak Hossain, Bridgewater, N.J.

[73] Assignee: Mentor Graphics Corporation, Wilsonville, Oreg.

[21] Appl. No.: 09/072,774

[22] Filed: May 5, 1998

[51] Int. Cl.[7] ............................ G06F 7/42; G06F 7/38; G06F 7/00
[52] U.S. Cl. ..................... 708/505; 708/495; 708/204
[58] Field of Search ................................ 708/495, 490, 708/505, 204

[56] References Cited

U.S. PATENT DOCUMENTS

| | | | |
|---|---|---|---|
| 5,561,810 | 10/1996 | Ohtomo ................................ | 708/490 |
| 5,677,861 | 10/1997 | Inoue et al. ........................... | 708/505 |
| 5,901,076 | 5/1999 | Lynch .................................... | 708/505 |
| 5,923,575 | 7/1999 | Efrat et al. ............................ | 708/505 |

*Primary Examiner*—Tan V. Mai
*Attorney, Agent, or Firm*—Columbia IP Law Group, LLC

[57] ABSTRACT

An improved floating point unit (FPU), equipped to perform floating point to integer conversion and integer addition in addition to floating point addition, is described. In one embodiment, the FPU includes a shifter, a bypass datapath, and a bypass multiplexer. The shifter receives an operand input and a control input, and shifts the operand input in accordance with the control input. The bypass datapath bypasses the operand input around the shifter. The bypass multiplexer is coupled to the shifter and the bypass datapath. The bypass multiplexer selects the bypass datapath to enable an integer addition if the operand is an integer operand, and selects the shifter to enable a floating point addition or floating point to integer conversion if the operand is a floating point operand. In an alternate embodiment, the FPU includes an alignment unit, an arithmetic logic unit (ALU), a bypass datapath, and a bypass multiplexer. The alignment unit receives a first input and a second input, and aligns them. The ALU is coupled to the alignment unit and receives and adds the aligned first and second inputs. The bypass datapath bypasses a predetermined one of the aligned inputs around the ALU. The bypass multiplexer is coupled with the ALU and the bypass datapath. The bypass multiplexer selects the bypass datapath to enable a floating point to integer conversion if the other input is an integer conversion factor, and selects the ALU to enable an integer or floating point addition if the other input is an integer or floating point number.

14 Claims, 4 Drawing Sheets

6,148,316

FLOATING POINT UNIT EQUIPPED ALSO TO PERFORM INTEGER ADDITION AS WELL AS FLOATING POINT TO INTEGER CONVERSION

FIELD OF THE INVENTION

The present invention pertains to the field of digital data processing. More particularly, this invention relates to a method and apparatus for performing integer addition and floating point to integer conversion in a digital data processing device, such as a digital signal processor or a microprocessor.

BACKGROUND OF THE INVENTION

Floating point notation is widely used in digital data processing devices to represent a much larger range of numbers than can be represented in regular binary notation. Various types of floating point notations are used. Typically, a floating point number has a sign bit (s), followed by an exponent field (e) and a mantissa or significand field (fff). Usually, the sign bit, exponent, and mantissa are applied to a formula such as:

$$\text{Value} = (-1)^s \times (1.\textit{fff}_2) \times 2^e.$$

Digital data processing devices use floating point units (FPU) to perform operations, such as addition and subtraction, on floating point numbers. In order to add or subtract floating point numbers, the decimal points must be aligned. The process is equivalent to addition or subtraction of base ten numbers in scientific notation. In order to align the decimal points, the FPU compares the exponents of each value and, if one is bigger than the other, shifts one of the mantissas so that the decimal places line up and the exponent values are equal. Generally, the mantissa of the smaller value is right shifted and the corresponding exponent is incremented for each bit position the mantissa is shifted.

Once the decimal points are aligned, the mantissas can be added or subtracted in accordance with the sign bits. The result may need to be normalized, or left shifted, so that a one is in the most significant bit position of the mantissa. The result may also be rounded.

Most digital data processing devices, in addition to supporting floating point numbers, also support integer numbers. An integer unit is typically provided to perform integer operations, such as addition and subtraction. Such prior art digital data processing devices suffer from at least the disadvantage of increased integrated circuit (IC) area requirements. Thus, it is desirable to perform integer operations using the FPU, eliminating the need for a dedicated integer unit.

SUMMARY OF THE INVENTION

An improved floating point unit (FPU), equipped to perform floating point to integer conversion and integer addition as well as floating point addition, is described. In one embodiment, the FPU includes a shifter, a bypass datapath, and a bypass multiplexer. The shifter receives an operand input and a control input, and shifts the operand input in accordance with the control input. The bypass datapath bypasses the operand input around the shifter. The bypass multiplexer is coupled to the shifter and the bypass datapath. The bypass multiplexer selects the bypass datapath to enable an integer addition if the operand is an integer operand, and selects the shifter to enable a floating point addition or floating point to integer conversion if the operand is a floating point operand.

In an alternate embodiment, the FPU includes an alignment unit, an arithmetic logic unit (ALU), a bypass datapath, and a bypass multiplexer. The alignment unit receives a first input and a second input, and aligns them. The ALU is coupled to the alignment unit and receives and adds the aligned first and second inputs. The bypass datapath bypasses a predetermined one of the aligned inputs around the ALU. The bypass multiplexer is coupled with the ALU and the bypass datapath. The bypass multiplexer selects the bypass datapath to enable a floating point to integer conversion if the other input is an integer conversion factor, and selects the ALU to enable an integer or floating point addition if the other input is an integer or floating point number.

BRIEF DESCRIPTION OF THE DRAWINGS

Examples of the present invention are illustrated in the accompanying drawings. The accompanying drawings, however, do not limit the scope of the present invention whatsoever. Like references in the drawings indicate similar elements.

DETAILED DESCRIPTION

In the following description, numerous specific details are set forth in order to provide a thorough understanding of the present invention. However, those skilled in the art will understand that the present invention may be practiced without these specific details. In other instances, well known methods, procedures, components, and circuits have not been described in detail.

Figure 1:
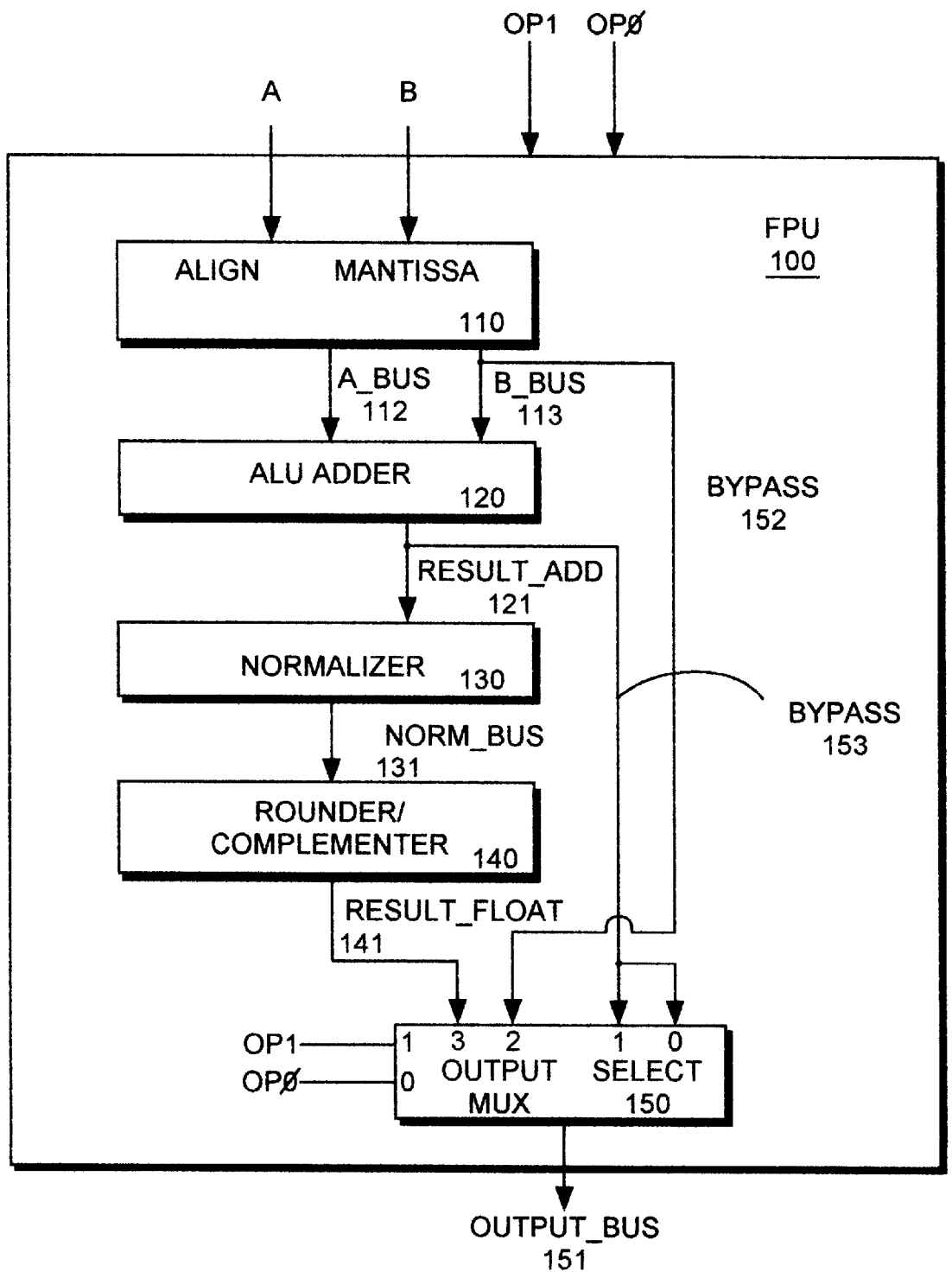
FIG. 1 illustrates an example of a floating point unit incorporating the teachings of the present invention.

FIG. 1 illustrates one embodiment of an improved floating point unit (FPU) 100 according to the teachings of the present invention. FPU 100 is used in a digital data processing device (not shown), such as a digital signal processor or a microprocessor, to perform floating point operations, such as floating point addition. As will be discussed in more detail below, FPU 100 also performs integer operations including integer addition and floating point to integer conversion, eliminating the need for separate dedicated integer units (IUs). As a result, area is saved within the digital data processing device.

Like conventional FPUs, FPU 100 includes align mantissa block 110, arithmetic logic unit (ALU) 120, normalizer 130, and rounder/complementer 140 coupled as shown. Except for the teachings of the present invention, align mantissa block 110, ALU 120, normalizer 130, and rounder/complementer 140 represent any of a number of such devices known in the art.

Unlike conventional FPUs, however, FPU 100 also includes two bypass paths 152 and 153, and output select multiplexer (mux) 150. Integer operations do not need to traverse the entire path through FPU 100, so bypass paths 152 and 153, and output select mux 150, improve nominal integer throughput, providing substantial time savings. As discussed below, the time savings are spent on integer checking operations. In certain embodiments, a digital data processing device employing FPU 100 achieves a significant area savings over digital data processing devices employing conventional FPUs and WUs with little or no increase in operational delay for integer as well as floating point operations.

In FIG. 1, FPU 100 is coupled to two input buses A and B, as well as control lines OP1 and OP0. OP1 and OP0 designate operations for FPU 100 to perform. For instance, in one embodiment, when OP1 is zero, FPU 100 performs integer addition. When OP1 is one and OP0 is zero, FPU 100 performs floating point to integer conversion. When OP1 is one and OP0 is one, FPU 100 performs floating point addition.

For conventional floating point addition, floating point numbers are provided on input buses A and B. In one embodiment, each input bus is 41 bits wide, with one sign bit, an eight bit exponent, and a 32 bit mantissa data field. Align mantissa block 110 aligns the decimal points of the numbers, and passes the aligned numbers to ALU 120 over A_BUS 112 and B_BUS 113. ALU 120 adds the mantissas, and passes the resulting mantissa to normalizer 130 over RESULT_ADD 121. Normalizer 130 performs any necessary left shifting to eliminate leading bits in the mantissa, and provides the normalized floating point number to rounder/complementer 140 over NORM_BUS 131. Rounder/complementer 140 may round the number up, which may require incrementing the exponent, depending on the outcome of the addition and normalization. The floating point number is provided to output select mux 150 over RESULT_FLOAT 141. Since OP1 and OP0 are both one for floating point addition, output select mux 150 selects the value on RESULT_FLOAT 141 and passes it to OUTPUT_BUS 151.

For floating point to integer conversion, a floating point number and a conversion factor, or shift factor, are provided on input buses A and B. As discussed in more detail below, align mantissa block 110 shifts the mantissa of the floating point number into an integer representation of the floating point number. The integer representation is provided on B_BUS 113, which is coupled to BYPASS 152, which is in turn coupled to output select mux 150. For floating point to integer conversion, OP1 is 1 and OP0 is 0, so the integer representation on BYPASS 152 is selected and passed to OUTPUT_BUS 151.

For integer addition, two integers are provided on input buses A and B. As will be discussed in more detail below, integers are already aligned so the shifting function of align mantissa block 110 is internally bypassed, and the integer values are provided to ALU 120 over A_BUS 112 and B_BUS 113. ALU 120 adds the integers and provides them on RESULT_ADD 121, which is coupled to BYPASS 153, which is in turn coupled to output select mux 150. For integer addition, OP1 is zero, so BYPASS 153 is selected and passed to OUTPUT_BUS 151.

Figure 2:
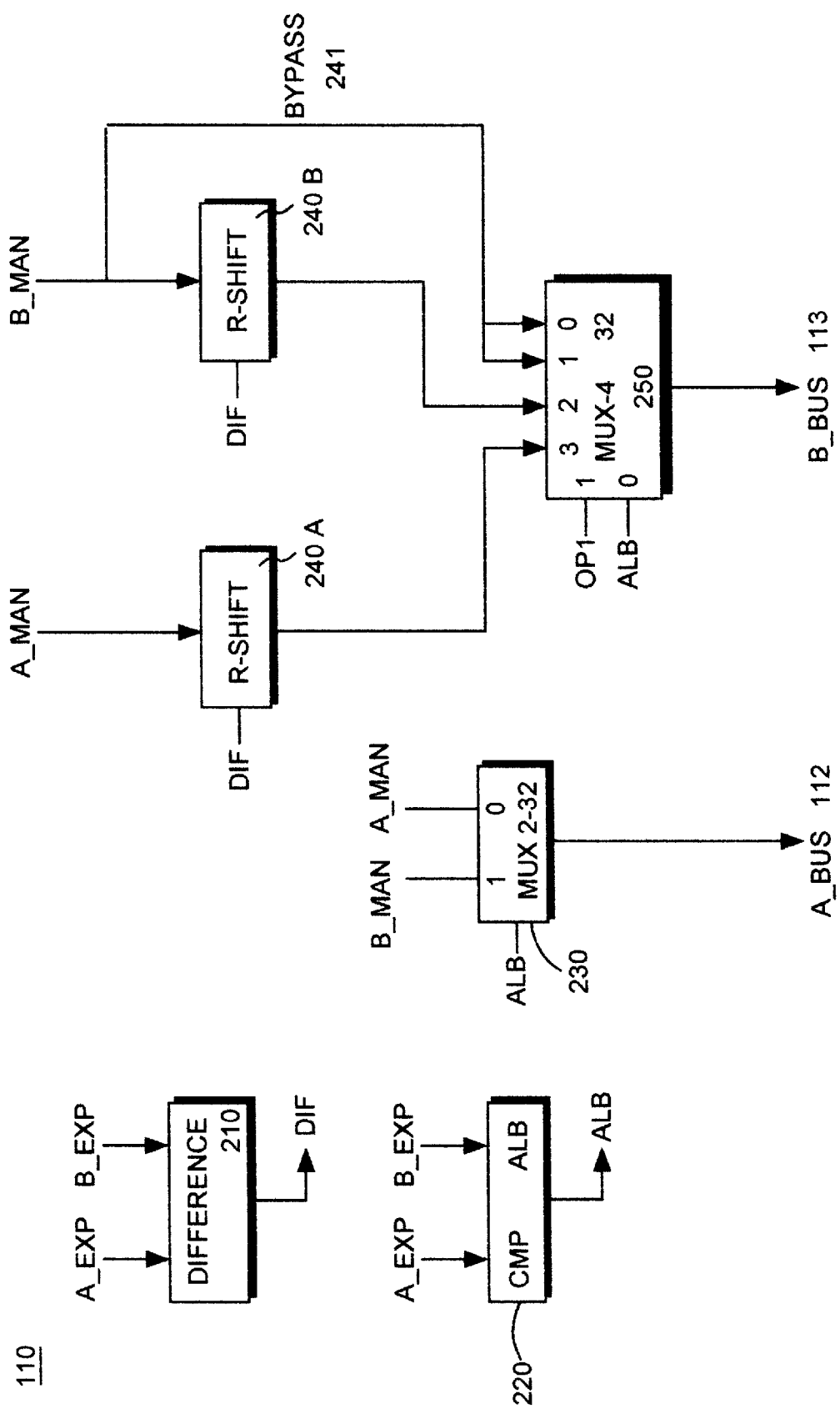
FIG. 2 illustrates one embodiment of an align mantissa block.

FIG. 2 illustrates one embodiment of align mantissa block 110. The exponent portions of the floating point numbers, A_EXP and B_EXP, are provided to difference calculator 210 and comparator 220. Difference calculator 210 calculates the magnitude of the difference between A_EXP and B_EXP, encodes the magnitude, and provides the output signal DIF to right shifters 240. Difference calculator 210 represents any one of a number of integer logic units. For instance, in one embodiment, difference calculator 210 comprises two subtractors. One subtracts A_EXP-B_Exp and provides the result to R-shifter 240B. The other subtracts B_Exp-A_Exp and provides the result to R-shifter 240A. In another embodiment, difference calculator 210 and R-shifters 240 comprise a combined adder-shifter as disclosed in copending U.S. patent application Ser. No. 09/071,358 titled "A Floating Point Unit Having a Unified Adder-Shifter Design," having the same assignee as the present application, and hereby incorporated by reference.

Right shifters 240 are provided in parallel to increase speed by eliminating a level of selection circuitry. In alternate embodiments, area may be saved by employing a selection mux and one shifter rather than two. In the illustrated embodiment, right shifters 240 receive the mantissa portions of the floating point numbers, A_MAN and B_MAN, and right shift both mantissas by the amount indicated by DIF. Right shifters 240 represent any of a number of shifters, including one or more layers of barrel shifters. Right shifters 240 provide the shifted mantissas to mux 250.

Align mantissa block 110 also includes BYPASS 241 which couples B_MAN with mux 250. One select line of mux 250 is coupled to OP1. As stated above, if OP1 is zero, integer addition is performed, so BYPASS 241 is selected. If OP1 is one, either a floating point addition or a floating point to integer conversion is performed. In which case, mux 250 selects either the right shifted A_MAN or right shifted B_MAN, depending on the value of the signal A<B.

The signal A<B is provided by comparator 220. Comparator 220 represents any one of a number of logical comparators. If A_EXP is less than B_EXP, the output signal A<B is one. If A_EXP is equal to or larger than B_EXP, A<B is zero. When OP1 is one, right shifted A_MAN is selected by mux 250 if A_EXP is less than B_EXP, and if A_EXP is equal to or more than B_EXP, right shifted B_MAN is selected by mux 250. The selected mantissa is provided on B_BUS 113.

The signal A<B is also provided to mux 230. Mux 230 passes B_MAN if A<B is one, and mux 230 passes A_MAN if A<B is zero, so that mux 230 and mux 250 select opposite inputs. The mantissa portion of the selected value is provided on A_BUS 112.

As an example, OP1 and OP0 indicate a conventional floating point addition of A=-1.0010 . . . 0$_2$×2$^3$ and B=1.010 . . . 0×2$^4$. The mantissa of A is 10010 . . . 0 and the mantissa of B is 1010 . . . 0. The difference between A_EXP and B_EXP is one, so DIF indicates a right shift of one. Right shifters 240 right shift the mantissas of A and B one bit position accordingly. OP1 is set to one for floating point addition, and A<B is one because A_EXP is smaller than B_EXP. Therefore, right shifted A_MAN, 010010 . . . 0, is selected and passed to B_BUS 113 by mux 250. That is, since A has the smaller exponent, A_MAN is right shifted and provided on the output bus B_BUS 113.

Since A<B is one, mux 230 passes B_MAN onto A_BUS 112. That is, since B has the larger exponent, B is not shifted and B_MAN is provided to ALU adder 120. Generally, for each bit position that a mantissa is right shifted, the exponent is incremented by one. Since the mantissa of A is right shifted a number of times equal to the difference between A_EXP and B_EXP, the equivalent exponent for A after it is right shifted is equal to B_EXP. In other words, A and B are aligned so that their exponents are equal.

As discussed with reference to FIG. 1 above, the aligned values are provided to ALU 120, so that the result on RESULT_ADD 121 is 010110 . . . 0. The result is normalized by normalizer 130 and rounded by rounder/complementer 140. The rounded result is provided on RESULT_FLOAT 141 to output select mux 150. In the illustrated example, OP1 and OP0 are 11 for floating point addition, so RESULT_FLOAT 141 is provided on OUTPUT_BUS 151.

Thus, FPU 100 performs conventional floating point operations with minimal change in performance because only two muxes, 150 and 250, have been added to or modified in the conventional datapath.

Turning now to floating point to integer conversion, in order to convert a floating point number to an integer, less than the entire path through FPU 100 is needed. Specifically, the mantissa of the floating point number to be converted needs only to be shifted so that the exponent is zero and the entire data field is to the left of the decimal point. Since a floating point number has the decimal to the right of the most significant one, the data field must be right shifted by one less than the number of bit positions in the data field minus the magnitude of the exponent of the floating point number.

Therefore, right shifters 240 of align mantissa block 110 can be used to perform the shifting, and ALU 120 and normalizer 130 can be bypassed over BYPASS 152. In one embodiment, the floating point number to be converted and a shifting factor are provided to align mantissa block 110 on input buses A and B. The shifting factor is a floating point value having any mantissa and any sign bit, but with an exponent value equal to the number of bit positions in the mantissa field minus one. The mantissa and the sign bit of the shift factor can be any value because ALU 120 is bypassed during floating point to integer conversion, so the values will not be used.

For example, FPU 100 can convert $1.00010\ldots0_2 \times 2^4$ to an integer. If the mantissa $100010\ldots0$ is 32 bits wide, the shift factor has an exponent of 31. In FIG. 2, difference calculator 210 subtracts 31−4=27. 27 is encoded and provided on DIF to right shifters 240. The floating point mantissa is right shifted 27 bit positions resulting in an integer value $0\ldots010001$. The mantissa of the shifting factor is also shifted, but since the exponent of the shift factor is larger than the exponent of the floating point number, mux 250 will select the shifted mantissa of the floating point number. That is, where OP1 is one for floating point to integer conversion, the signal A<B will always select the floating point number at mux 250 no matter which input bus the floating point number is on.

As discussed above with respect to FIG. 1, the converted integer value is provided on B_BUS 113 which is coupled to BYPASS 152, which in turn is coupled to output select mux 150. OP0 is zero for floating point to integer conversion, so output select mux 150 will bypass ALU 120, normalizer 130, and rounder/complementer 140 to provide the converted integer value on OUTPUT_BUS 151, resulting in a significant time savings through FPU 100.

For floating point to integer conversion, then, only one mux, mux 150, has been added to the datapath through FPU 100. More importantly, however, since much of FPU 100 is bypassed when performing floating point to integer conversion, floating point to integer conversion is accomplished much faster relative to conventional floating point operations. Therefore, even if additional checking logic is incorporated on bypass path 152, such as integer overflow checking, the throughput for floating point to integer conversion will at most approximate that of conventional floating point operations. For instance, in one embodiment, rounder/complementer 140 can be endowed with integer overflow checking circuitry known in the art, and bypass 152 can be routed through round/complementer 140. In other embodiments, additional checking logic can be external to FPU 100.

Turning now to integer addition, integers are provided to FPU 100 in the mantissa portions of input buses A and B. In which case, in one embodiment, the exponent lines of input buses A and B are all zeros. In FIG. 2, if A_EXP=B_EXP=zero, then DIF equals zero and A<B equals zero. Therefore, mux 230 passes A_MAN onto A_BUS 112, and since OP1 is zero for integer addition, mux 250 passes B_MAN onto B_BUS 113 over BYPASS 241. A significant time savings is gained by bypassing the combinational logic of right shifters 240. Only a small amount of hardware must be added to align mantissa block 110 to perform integer addition because, with the exception of BYPASS 241 and additional inputs on mux 250, align mantissa block 110 represents any one of a number of devices known in the art.

As discussed above with respect to FIG. 1, the integers are provided to ALU 120 and added. The result is provided on RESULT_ADD 121 which is coupled to BYPASS 153, which is in turn coupled to output select mux 150. OP1 is zero for integer addition, so output select mux 150 bypasses normalizer 130 and rounder/complementer 140 to provide the result on OUTPUT_BUS 151, resulting in an additional time savings through FPU 100.

As for floating point to integer conversion, integer addition requires only minimal changes to FPU 100. Specifically, mux 150 has been added to the datapath through FPU 100 and mux 250 has been modified to accommodate an additional input. More importantly, however, since much of FPU 100 is bypassed when performing integer addition, integer addition is accomplished much faster relative to conventional floating point operations. Therefore, even if additional checking logic is incorporated on bypass path 153, such as integer overflow checking, the throughput for integer addition will at most approximate that of conventional floating point operations. For instance, in one embodiment, rounder/complementer 140 can be endowed with integer overflow checking circuitry or complementing circuitry known in the art, and bypass 153 can be routed through rounder/complementer 140.

Figure 3:
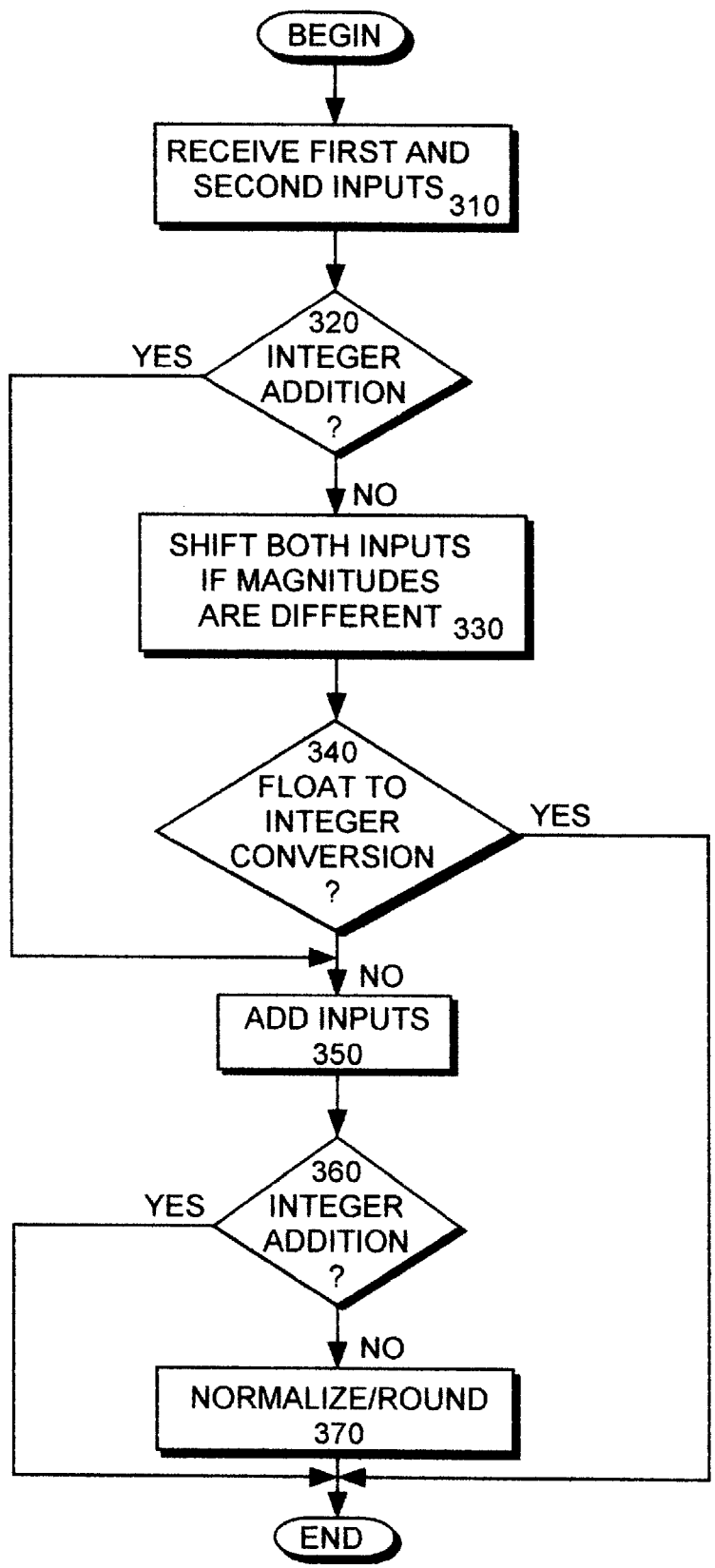
FIG. 3 is a flow chart of one embodiment of the present invention.

FIG. 3 is a flow chart summarizing the method steps of the invention illustrated in FIG. 1. In block 310, FPU 100 receives first and second inputs on input buses A and B. In block 320, if the digital processing device indicates an integer addition, then block 330, i.e. the shifting of the mantissas, is bypassed. If an integer addition is not indicated, then in block 330 align mantissa 110 right shifts the inputs if they have different orders of magnitude, and selects the smaller magnitude input. In block 340, if the host system indicates a floating point to integer conversion, steps 350, 360, and 370, i.e. addition, normalization, and rounding, are bypassed. If, however, floating point to integer conversion is not indicated, the inputs, one of which may have been shifted, are provided to ALU 120 in block 350 and added. In block 360, if integer addition is indicated, block 370 is bypassed. If integer addition is not indicated, the output of ALU 120 is rounded and normalized in block 370. As discussed above, in alternate embodiments integer checking operations can also be incorporated into the FPU datapath.

In alternate embodiments, the most significant one in the floating point mantissa is "hidden." That is, the mantissa of a normalized floating point number always starts with a one, so the one can be hidden, or packed. Those skilled in the art, after having read the forgoing, will recognize that the teachings of the present invention can likewise be applied to hidden one floating point notation. Similarly, the present invention can be applied to numbers in signed magnitude or 2's complement, as well as various input bus, sign, exponent, mantissa, and integer field widths.

In alternate embodiments, a control bus may provide more or fewer inputs than OP1 and OP0. For instance, FPU 100 may discern the operation to be performed from the format of the number received, in which case no control bus would be necessary. For instance, FPU 100 may recognize a floating point to integer conversion based on an identifiable mantissa bit pattern in the shift factor. Similarly, FPU 100 may recognize an integer addition where both exponents are all zeros. Alternately, a single control line could be used to distinguish integer operations from floating point operations.

In alternate embodiments, ALU 120 may perform addition and subtraction of positive and negative numbers. Multiplexers 150 and 250 may include more or fewer inputs and select lines depending on the number of different operations that FPU 100 can perform. Multiplexer 150 can be eliminated all together where, for instance, FPU 100 includes separate floating point and integer output buses. Various components within FPU 100 can be eliminated, combined, rearranged, added to, or replaced with any number of components known in the art to perform the various tasks within FPU 100.

Figure 4:
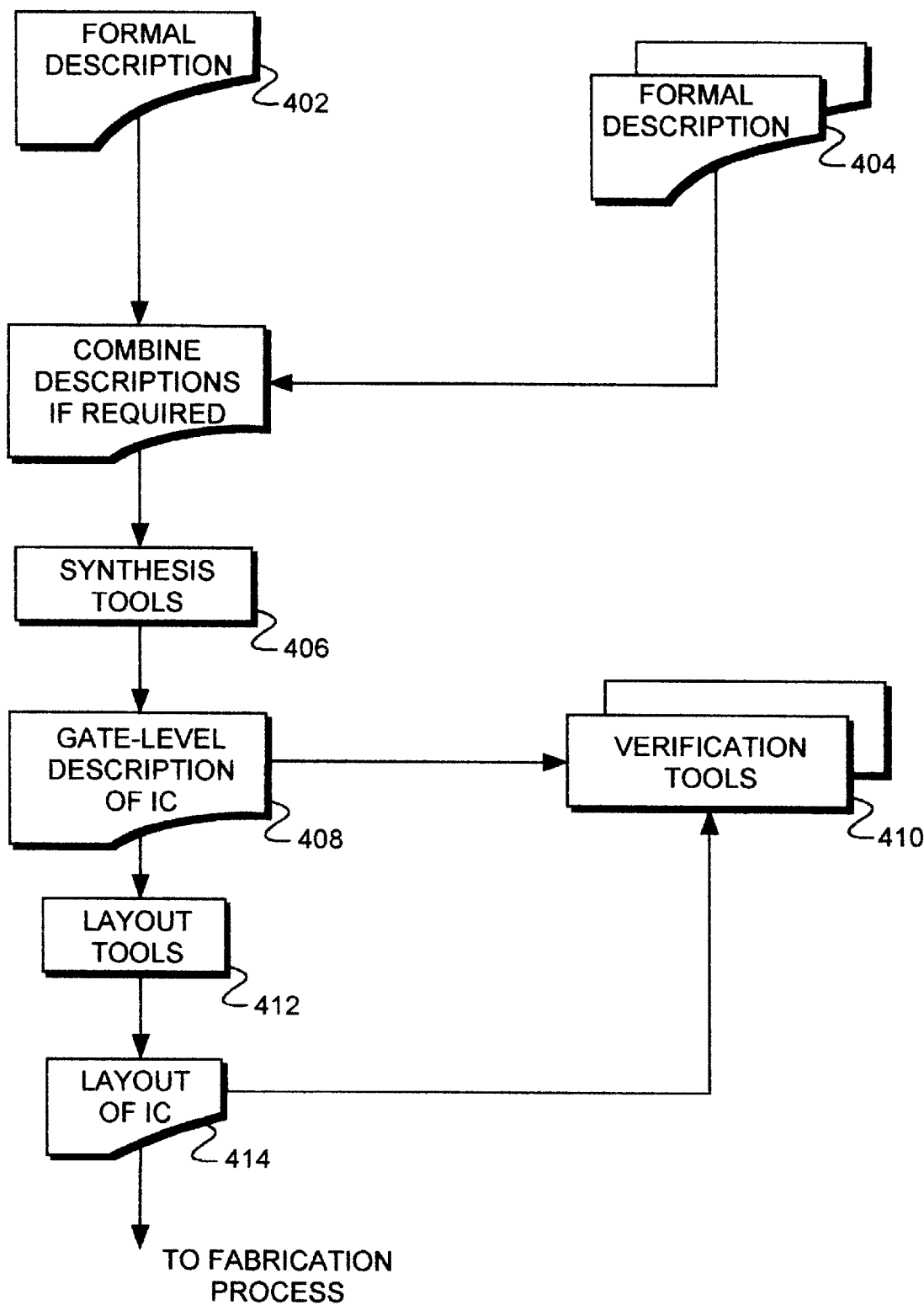
FIG. 4 illustrates a design process incorporating the present invention.

Turning now to FIG. 4, a block diagram is shown illustrating one embodiment of a design process for designing an integrated circuit (IC) incorporating the innovative features of FPU 100. As illustrated, a formal description 402 of the FPU is prepared. Formal description 402 may be prepared in any one of the formal IC description languages known in the art, such as Very High Speed Integrated Circuit (VHSIC) Hardware Description Language, or VHDL, Verilog, and the like, using any one of a number of know design description editors supporting the desired formal description language.

Formal description 402 is then optionally merged with formal descriptions 404 of other function blocks of the IC, if the FPU is to be fabricated as an integral part of a "larger" IC. Formal description 402, or the merged formal descriptions of 402 and 404, are then provided to synthesis tools 406 to synthesize, i.e. to generate, a gate-level description 408 of the IC to be fabricated. Formal description 402 is provided to synthesis tools 406 in a manner that allows the special design of the FPU of the present invention to be directly incorporated into gate-level description 408, substituting for the conventional implementations that would have been otherwise synthesized for the FPU by synthesis tools 406. The gate-level description 408 may then be used by a number of verification tools 410, such as simulators or emulators, to verify the correctness of the design. An example of a verification tool is the SimExpress™ emulator product manufactured by Meta System of Sacley, France, a wholly owned subsidiary of the assignee of the present invention.

Upon verification, or in parallel, gate-level description 408 of the IC is then provided to layout tools 412 to generate physical layout description 414 of the IC. Layout description 414 is also subjected to verification by layout level ones of verification tools 410. An example of layout level verification is parasitic analysis for submicron level integration. Upon verification, layout description 414 of the IC is then provided to the fabrication process to fabricate the desired IC.

Those skilled in the art will appreciate that the design process and the fabrication process may be performed by different parties. In fact, the creation of formal description 402 may be performed by a party independent of the party or parties who prepare formal descriptions 404 for the other function blocks, and/or the party or parties who perform the synthesis, verifications, etc. Formal description 402 may be provided to these other parties via any one of a number of known data transfer methods, e.g. through a removable storage medium such as magnetic tape, compact disk (CD), digital versatile disk (DVD), and the like, or through networked data communication links. In this context, formal description 402 is often referred to as a "soft core."

Thus, a modified floating point unit is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:

an alignment unit, to receive a first input and a second input, and to align the first and second inputs;

a plurality of computational units, coupled to the alignment unit, to receive and add the aligned first and second inputs;

a first bypass datapath to bypass a predetermined one of the aligned first and second inputs around the plurality of computational units; and a first bypass multiplexer, coupled with the plurality of computational units and the first bypass datapath, to select the first bypass datapath for a floating point to integer conversion if the other one of the aligned first and second inputs is an integer conversion factor, and to select the plurality of computational units for a floating point addition if the other one of the aligned first and second input is a floating point input.

2. The apparatus if claim 1 wherein the alignment unit comprises:

a shifter, to receive an operand of the predetermined input and a control input, and to shift the operand in accordance with the control input;

a second bypass datapath to bypass the operand around the shifter; and a second bypass multiplexer, coupled to the shifter and the second bypass datapath, to select the second bypass datapath for an integer addition of the operand is an integer operand, and to select the shifter for the floating point addition or the floating point to integer conversion if the operand is a floating point operand.

3. The apparatus of claim 1 further comprising:

a control bus, coupled to the first bypass multiplexer, to designate at least one of an integer addition, the floating point addition, and the floating point to integer conversion.

4. The apparatus of claim 1 wherein the plurality of computational units comprises:

an arithmetic logic unit (ALU), coupled to the alignment unit, to receive the aligned first and second inputs;

a normalization unit, coupled to the ALU, to normalize an output of the ALU; and a rounding unit, coupled to the normalization unit, to round an output of the normalization unit, wherein the first bypass multiplexer is further to select an output of the rounding unit for the floating point addition.

5. A machine-readable storage medium having stored thereon formal descriptions describing a floating point unit to perform floating point operations and integer operations, wherein when synthesized said formal descriptions yield a gate-level description of an integrated circuit including:
　　an alignment unit, to receive a first input and a second input, and to align the first and second inputs;
　　a plurality of computational units, coupled to the alignment unit, to receive and add the aligned first and second inputs;
　　a first bypass datapath to bypass a predetermined one of the aligned first and second inputs around the plurality of computational units; and
　　a first bypass multiplexer, coupled with the plurality of computational units and the first bypass datapath, to select the first bypass datapath for a floating point to integer conversion if the other one of the aligned first and second inputs is an integer conversion factor, and to select the plurality of computational units for a floating point addition if the other one of the aligned first and second inputs is a floating point input.

6. The machine readable storage medium of claim 5 wherein the formal descriptions are in a hardware description language (HDL).

7. The machine readable storage medium of claim 6 wherein the HDL is one of a Very High Speed Integrated Circuit (VHSIC) Description Language (VHDL) and Verilog.

8. An apparatus comprising:
　　a first data path comprising a shifter and an adder to add two floating point numbers;
　　a second data path comprising the shifter and bypassing the adder to convert a floating point number to an integer; and
　　a third data path comprising the adder and bypassing the shifter to add two integers.

9. The apparatus of claim 8 further comprising:
　　at least one multiplexer to select from among the first data path, the second data path, and the third data path.

10. The apparatus of claim 8 further comprising:
　　at least one output port for integer results; and
　　at least one output port for floating point results.

11. A machine-readable storage medium having stored thereon formal descriptions that when synthesized yield a lower-level description of an integrated circuit comprising:
　　a first data path comprising a shifter and an adder to add two floating point numbers;
　　a second data path comprising the shifter and bypassing the adder to convert a floating point number to an integer; and
　　a third data path comprising the adder and bypassing the shifter to add two integers.

12. The machine-readable storage medium of claim 11 wherein the lower-level description further comprises:
　　at least one multiplexer to select from among the first data path, the second data path, and the third data path.

13. The machine-readable storage medium of claim 11 wherein the lower-level description further comprises:
　　at least one output port for integer results; and
　　at least one output port for floating point results.

14. A method comprising:
　　aligning and adding a first input and a second input if the first input and the second input are floating point numbers;
　　aligning the first input and the second input and bypassing addition of the first input and the second input if the first input is a conversion factor and the second input is a floating point number; and
　　adding the first input and the second input and bypassing alignment of the first input and the second input if the first input and the second input are integers.

* * * * *

UNITED STATES PATENT AND TRADEMARK OFFICE
CERTIFICATE OF CORRECTION

PATENT NO. : 6,148,316
DATED : November 14, 2000
INVENTOR(S) : Herbert et al.

Page 1 of 1

It is certified that error appears in the above-identified patent and that said Letters Patent is hereby corrected as shown below:

Column 3,
Line 2, "WUs" should read -- IUs --.

Column 8,
Line 35, "input" should read -- inputs --.
Line 36, "if" should read -- of --.
Line 46, "of" should read -- if --.

Signed and Sealed this

Twelfth Day of March, 2002

Attest:

JAMES E. ROGAN
*Attesting Officer*   *Director of the United States Patent and Trademark Office*